United States Patent
Ishikawa (10) Patent No.: US 7,050,700 B2
(45) Date of Patent: May 23, 2006

(54) PICTURE COMPRESSION MANAGING APPARATUS AND PICTURE COMPRESSION MANAGING METHOD USED THEREFOR

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1165 days.

(21) Appl. No.: 09/855,533

(22) Filed: May 16, 2001

(65) Prior Publication Data

US 2001/0043796 A1    Nov. 22, 2001

(30) Foreign Application Priority Data

May 17, 2000    (JP)    ............................. 2000-144242

(51) Int. Cl.
*H04N 5/91*    (2006.01)
(52) U.S. Cl. ............................. 386/69; 386/95; 386/111
(58) Field of Classification Search .................. 386/95, 386/68, 125–126, 124, 111; 375/240.15
See application file for complete search history.

(56) References Cited

U.S. PATENT DOCUMENTS 5,959,690 A * 9/1999 Toebes et al. ............ 375/40.15
6,798,976 B1 * 9/2004 Tsumagari et al. ............ 386/95

FOREIGN PATENT DOCUMENTS

JP    09-200772    7/1997

* cited by examiner

*Primary Examiner*—Vincent F. Boccio
(74) *Attorney, Agent, or Firm*—Foley & Lardner LLP (57) ABSTRACT

In a picture compression managing apparatus, a reduced picture producing section (23, 26) produces, in response to an index affix request, a reduced input picture by reducing a current input picture of a succession of input pictures included in a picture file which is subjected to picture compression. The reduced picture producing section carries out at least one of output of the reduced input picture to a display unit and storage of the reduced input picture into the recording medium. An index producing section (13, 25) produces, in response to the index affix request, a marking position which is a position of the current input picture with respect to a leading position of the picture file. The index producing section carries out storage of the marking position as a particular index into the recording medium. A reference frame producing section (21, 27) produces at least one of remaining pictures of a succession of the input pictures. The above-mentioned at least one of remaining pictures is used as at least one reference frame in later compressing the current input picture into a compressed picture. The reference frame producing section carries out storage of the above-mentioned at least one reference frame into the recording medium.

8 Claims, 11 Drawing Sheets

| INDEX | REDUCED PICTURE | STORE ADDRESS | REFERENCE PICTURE |
|---|---|---|---|
| 1 | B6 | 120 | P4P7 |
| 2 | P160 | 2652 | I117 |
| 3 | B251 | 5045 | P250P253 |
| ⋮ | ⋮ | ⋮ | ⋮ |

PICTURE COMPRESSION MANAGING APPARATUS AND PICTURE COMPRESSION MANAGING METHOD USED THEREFOR

BACKGROUND OF THE INVENTION

This invention relates to a picture compression managing apparatus and a picture compression managing method used therefor and, in particular, to an apparatus for carrying out digital compression of picture data or audio data to store compressed picture data or compressed audio data in a disk or a memory.

In an apparatus for carrying out digital compression of picture data or audio data to store compressed picture data or compressed audio data in a disk or a memory, one of merits is high random accessibility to a desired scene.

In a moving picture compression method utilizing interframe predictive coding, a frame to be decompressed may be a product of predictive coding. In this event, a reference frame must be decompressed first.

In order to affix an index to a picture compressed by predictive coding, use is typically made of a technique of detecting a key frame obtained by intraframe coding, for example, an I picture (intra-coded picture) and allowing jumping to the key frame. This technique is disclosed, for example, in Japanese Unexamined Patent Publication (A) No. H09-200772.

In the technique described in the above-referenced publication, a picture extracting section and a picture reducing section are provided. Specifically, a video bit stream is obtained by interframe compression, including periodical intraframe compression, as in the MPEG (Moving Picture Experts Group) system. The video bit stream is decoded by the use of a variable-length decoder, a dequantizer, an inverse DCT (Discrete Cosine Transform) unit, and so on. In this event, the picture extracting section extracts an intraframe compressed scene, i.e., an I picture from the video bit stream. The picture reducing section reduces the I picture thus extracted to produce a reduced picture. The reduced picture is written in a frame memory. Thus, multi-picture or multi-scene display is enabled and search is facilitated with a reduced scene used as an index.

In the existing technique mentioned above, the keyframe obtained by intraframe coding, for example, the I picture is detected and jumping to the key frame is allowed. Accordingly, the frame to which the index can be added is fixed or restricted.

SUMMARY OF THE INVENTION

It is therefore an object of this invention to provide a picture compression managing apparatus and a picture compression managing method used therefor, which are capable of affixing an index to any desired frame of a compressed picture.

It is another object of this invention to provide a picture compression managing apparatus and a picture compression managing method used therefor, which are capable of carrying out high-speed decompression of a frame having a designated index.

Other objects of this invention will become clear as the description proceeds.

Picture compression managing apparatuses according to this invention, a picture decompression processor according to this invention, picture compression managing methods according to this invention, and a picture decompression processing method according to this invention are as follows:

(1) A picture compression managing apparatus comprising:

a reduced picture producing section for producing, in response to an index affix request, a reduced input picture by reducing a current input picture of a succession of input pictures included in a picture file which is subjected to picture compression, the reduced picture producing section carrying out at least one of output of the reduced input picture to a display unit and storage of the reduced input picture into the recording medium; and an index producing section for producing, in response to the index affix request, a marking position which is a position of the current input picture with respect to a leading position of the picture file, the index producing section carrying out storage of the marking position as a particular index into the recording medium.

(2) A picture compression managing apparatus comprising:

a reduced picture producing section for producing, in response to an index affix request, a reduced input picture by reducing a current input picture of a succession of input pictures included in a picture file which is subjected to picture compression, the reduced picture producing section carrying out at least one of output of the reduced input picture to a display unit and storage of the reduced input picture into the recording medium;

an index producing section for producing, in response to the index affix request, a marking position which is a position of the current input picture with respect to a leading position of the picture file, the index producing section carrying out storage of the marking position as a particular index into the recording medium; and a reference frame producing section for producing at least one of remaining pictures of a succession of the input pictures, the above-mentioned at least one of remaining pictures being used as at least one reference frame in later compressing the current input picture into a compressed picture, the reference frame producing section carrying out storage of the above-mentioned at least one reference frame into the recording medium.

(3) A picture compression managing apparatus as described in the paragraph (2), further comprising:

an index acquiring section for acquiring, in response to a jump request to jump to the particular index on subjecting the picture file to picture decompression, the marking position from the recording medium; and a reference frame acquiring section for acquiring, in response to the jump request, the above-mentioned at least one reference frame from the recording medium.

(4) A picture decompression processor for decompressing a succession of input pictures included as a succession of compressed pictures in a picture file which is subjected to picture decompression, the picture decompression processor comprising:

a reduced picture producing section for producing, in response to an index affix request, a reduced input picture by reducing a current input picture of the succession of input pictures included in the picture file, the reduced picture producing section carrying out at least one of output of the reduced input picture to a display unit and storage of the reduced input picture into the recording medium;

an index producing section for producing, in response to the index affix request, a marking position which is a position of the current input picture with respect to a leading position of the picture file, the index producing section carrying out storage of the marking position as a particular index into the recording medium; and a reference frame producing section for producing at least one of remaining pictures of a succession of the input pictures, the above-mentioned at least one of remaining pictures being used as at least one reference frame in later decompressing the current input picture into a decompressed picture, the reference frame producing section carrying out storage of the above-mentioned at least one reference frame into the recording medium.

(5) A picture compression managing method comprising:

a reduced picture producing step of producing, in response to an index affix request, a reduced input picture by reducing a current input picture of a succession of input pictures included in a picture file which is subjected to picture compression, the reduced picture producing step carrying out at least one of output of the reduced input picture to a display unit and storage of the reduced input picture into the recording medium; and an index producing step of producing, in response to the index affix request, a marking position which is a position of the current input picture with respect to a leading position of the picture file, the index producing step carrying out storage of the marking position as a particular index into the recording medium.

(6) A picture compression managing method comprising:

a reduced picture producing step of producing, in response to an index affix request, a reduced input picture by reducing a current input picture of a succession of input pictures included in a picture file which is subjected to picture compression, the reduced picture producing step carrying out at least one of output of the reduced input picture to a display unit and storage of the reduce input picture into the recording medium;

an index producing step of producing, in response to the index affix request, a marking position which is a position of the current input picture with respect to a leading position of the picture file, the index producing step carrying out storage of the marking position as a particular index into the recording medium; and a reference frame producing step of producing at least one of remaining pictures of a succession of the input pictures, the above-mentioned at least one of remaining pictures being used as at least one reference frame in later compressing the current input picture into a compressed picture, the reference frame producing step carrying out storage of the above-mentioned at least one reference frame into the recording medium.

(7) A picture compression managing method as described in the paragraph (6), further comprising:

an index acquiring step of acquiring, in response to a jump request to jump to the particular index on subjecting the picture file to picture decompression, the marking position from the recording medium; and a reference frame acquiring step of acquiring, in response to the jump request, the above-mentioned at least one reference frame from the recording medium.

(8) A picture decompression processing method of decompressing a succession of input pictures included as a succession of compressed pictures in a picture file which is subjected to picture decompression, the picture decompression processing method comprising:

a reduced picture producing step for producing, in response to an index affix request, a reduced input picture by reducing a current input picture of the succession of input pictures included in the picture file, the reduced picture producing step carrying out at least one of output of the reduced input picture to a display unit and storage of the reduced input picture into the recording medium;

an index producing step of producing, in response to the index affix request, a marking position which is a position of the current input picture with respect to a leading position of the picture file, the index producing section carrying out storage of the marking position as a particular index into the recording medium; and a reference frame producing step of producing at least one of remaining pictures of a succession of the input pictures, the above-mentioned at least one of remaining pictures being used as at least one reference frame in later decompressing the current input picture into a decompressed picture, the reference frame producing step carrying out storage of the above-mentioned at least one reference frame into the recording medium.

Thus, the picture compression managing apparatus according to this invention provides a structure such that, when a moving picture is compressed into compressed data and the compressed data is decompressed, reproduction from a desired position marked with the index during compression can instantaneously and immediately be carried out.

More specifically, if the marking request is supplied from user input means during picture compression, index memorizing means memorize the marking position with respect to the start position of the picture file being compressed and stored and index output means delivers position information representative of the marking position to the recording medium such as a disk.

The marking position designated by the user is stored in relation to the reduced input picture, the position in the compressed picture file, the reference picture required for reproduction. It is therefore possible to carry out high-speed reproduction from the particular frame at the marking position designated by the request.

DESCRIPTION OF THE PREFERRED EMBODIMENTS

Now, description will be made of embodiments of this invention with reference to the drawing.

Figure 1:
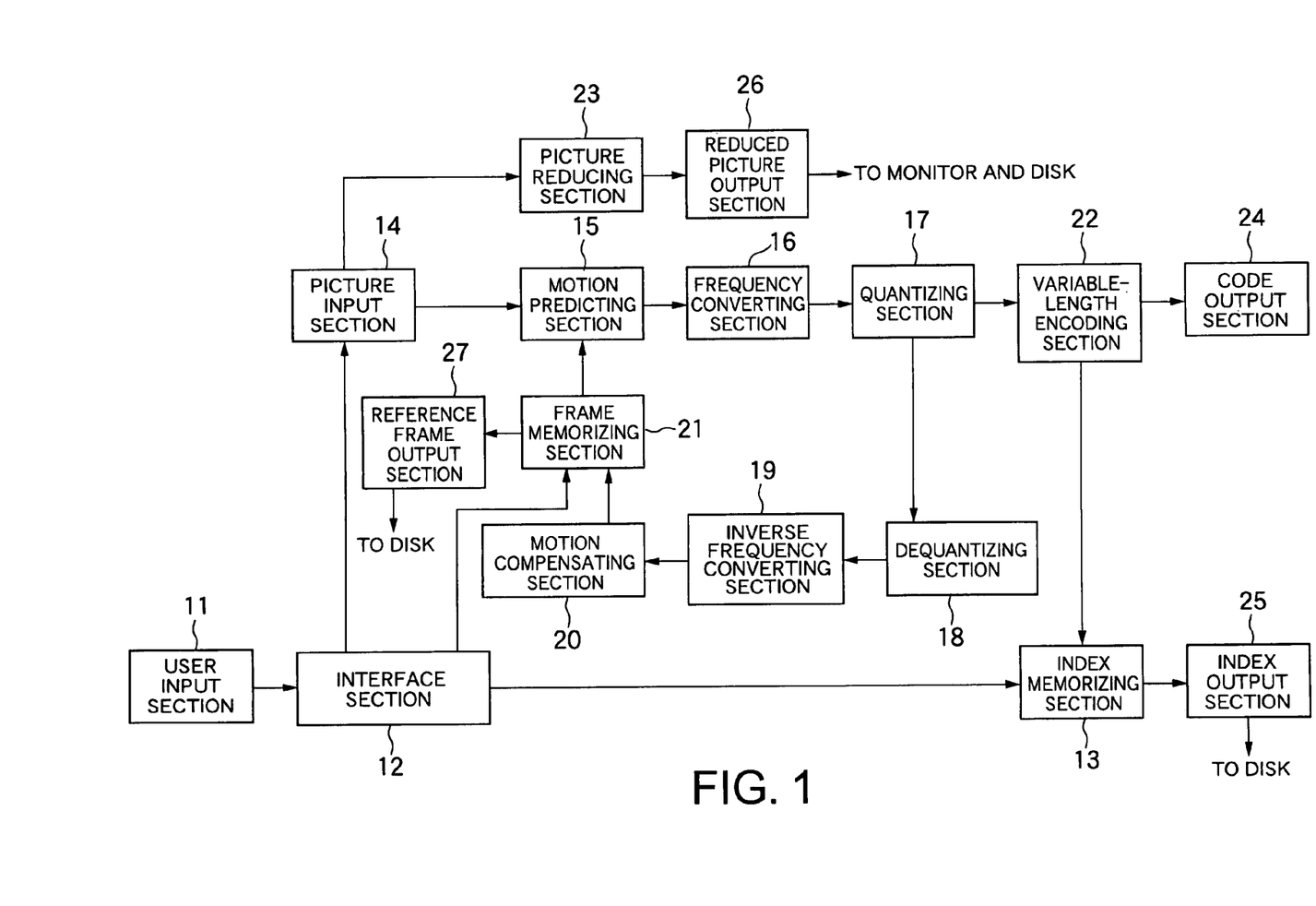
FIG. 1 is a block diagram of a picture compression processor of a picture compression managing apparatus according to an embodiment of this invention.

At first referring to FIG. 1, a picture compression managing apparatus according to an embodiment of this invention has a picture compression processor including a user input section 11, an interface section 12, an index memorizing section 13, a picture input section 14, a motion predicting section 15, a frequency converting section 16, a quantizing section 17, a dequantizing section 18, an inverse frequency converting section 19, a motion compensating section 20, a frame memorizing section 21, a variable-length encoding section 22, a picture reducing section 23, a code output section 24, an index output section 25, a reduced picture output section 26, and a reference frame output section 27.

Each of the above-mentioned sections is generally operable in the following manner. The picture input section 14 acquires a picture frame by frame from a camera or a disk. The motion predicting section 15 calculates a correlation between a current frame and a preceding frame, determines a prediction block which shows in the preceding frame a highest correlation with a block of the current frame, and calculates a difference between the block under consideration and the prediction block to produce difference data.

The frequency converting section 16 converts the difference data into a frequency component. The quantizing section 17 quantizes the frequency component into quantized data. The variable-length encoding section 22 encodes the quantized data into a compression code. The code output section 24 delivers the compression code to a disk (a recording medium).

In order to prepare a reference frame for next frame compression, the quantized data produced by the quantizing section 17 is dequantized by the dequantizing section 18 into a dequantized frequency component. The inverse frequency converting section 19 converts the dequantized frequency component into a pixel component. Supplied with the pixel component, the motion compensating section 20 prepares data for the reference frame. The reference frame data is stored in the frame memorizing section 21.

If a marking request (a index affix request) to affix a particular index to a particular frame is supplied by the use of a mouse or a keyboard to the user input section 11 during the compressing operation, the marking request is sent to the interface section 12. Then, the interface section 12 requests each of the index memorizing section 13, the picture input section 14, and the frame memorizing section 21 to store related information.

Specifically, the index memorizing section 13 memorizes a recording position in a file being stored where the particular frame is recorded. The index output section 25 delivers position information representative of the recording position to the recording medium.

The picture input section 14 sends the particular frame to the picture reducing section 23. The picture reducing section 23 reduces the particular frame into a reduced picture. The reduced picture output section 26 delivers the reduced picture to a monitor (or a display unit) and a disk (the recording medium). Depending upon the application, the reduced picture output section 26 may deliver the reduced picture to only one of the monitor and the disk (the recording medium).

In case where it is necessary to use the reference frame on compression of the particular frame, the frame memorizing section 21 delivers the reference frame to the recording medium through the reference frame output section 27.

Figure 2:
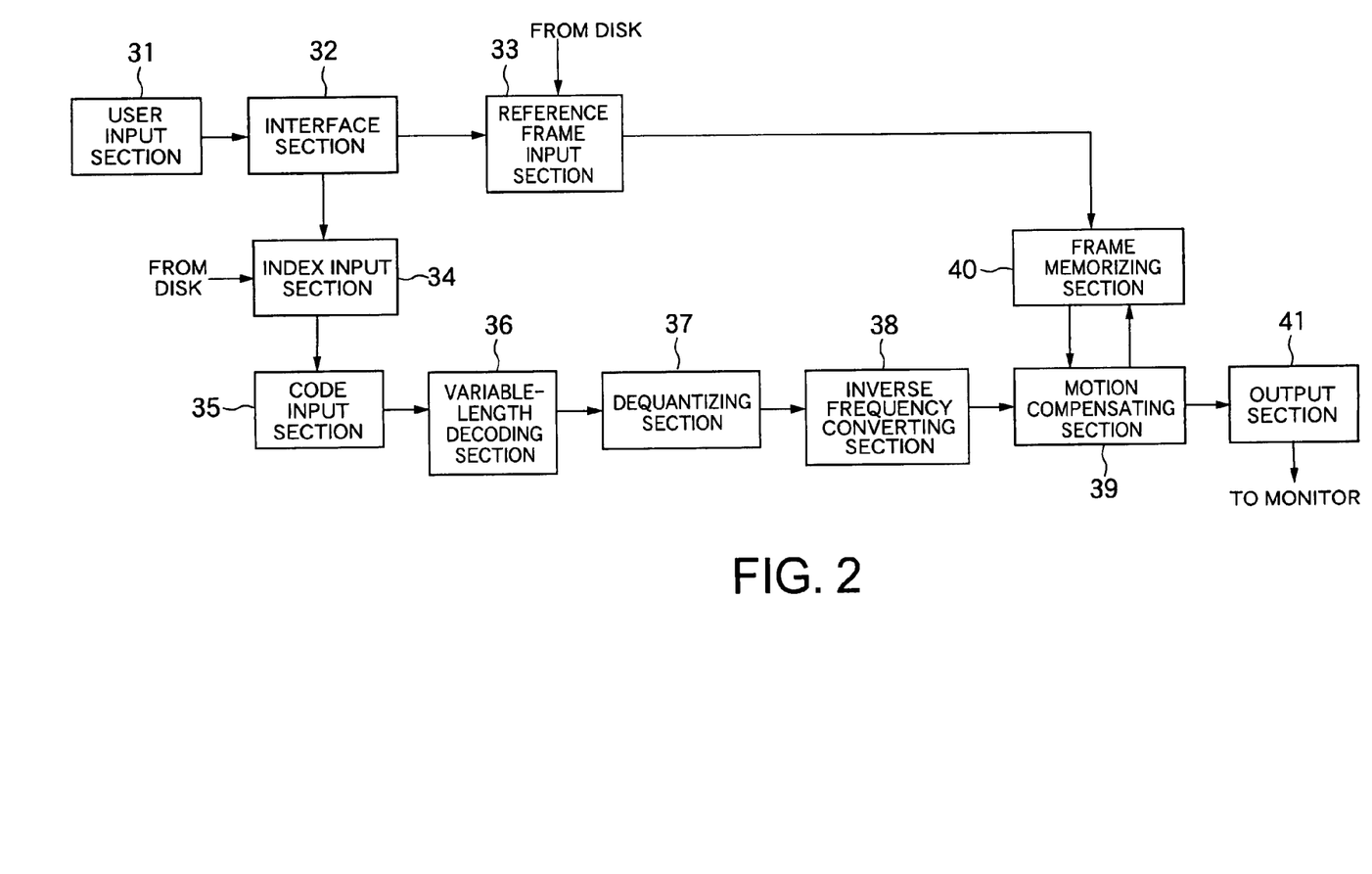
FIG. 2 is a block diagram of a picture decompression processor of the picture compression managing apparatus according to the embodiment of this invention.

Referring to FIG. 2, the picture compression managing apparatus has a picture decompression processor including a user input section 31, an interface section 32, a reference frame input section 33, an index input section 34, a code input section 35, a variable-length decoding section 36, a dequantizing section 37, an inverse frequency converting section 38, a motion compensating section 39, a frame memorizing section 40, and an output section 41.

Each of these sections is generally operable in the following manner. When the code input section 35 receives a compressed picture code from a recording medium such as a disk, the variable-length decoding section 36 decodes the compressed picture code into a frequency component. The dequantizing section 37 dequantizes the frequency component into a dequantized frequency component. The inverse frequency converting section 38 converts the dequantized frequency component into a pixel component. The motion compensating section 39 adds the pixel component to the reference frame memorized in the frame memorizing section 40 to produce picture data. The output section 41 delivers the picture data to a monitor. The picture data thus prepared is stored in the frame memorizing section 40 as a next reference frame.

If a jump request to jump to the marking position is supplied by the use of a mouse or a keyboard to the user input section 31 during the decompressing operation, the jump request is sent to the interface section 32. The interface section 32 transfers the jump request to the reference frame input section 33 and the index input section 34.

If the reference frame is required in order to decompress the particular frame, the reference frame input section 33 acquires the reference frame from the recording medium and delivers the reference frame to the frame memorizing section 40.

The index input section 34 acquires from the recording medium the recording position in the compressed file where the particular frame is recorded and sends designation of an output address to the code input section 35.

Figure 3:
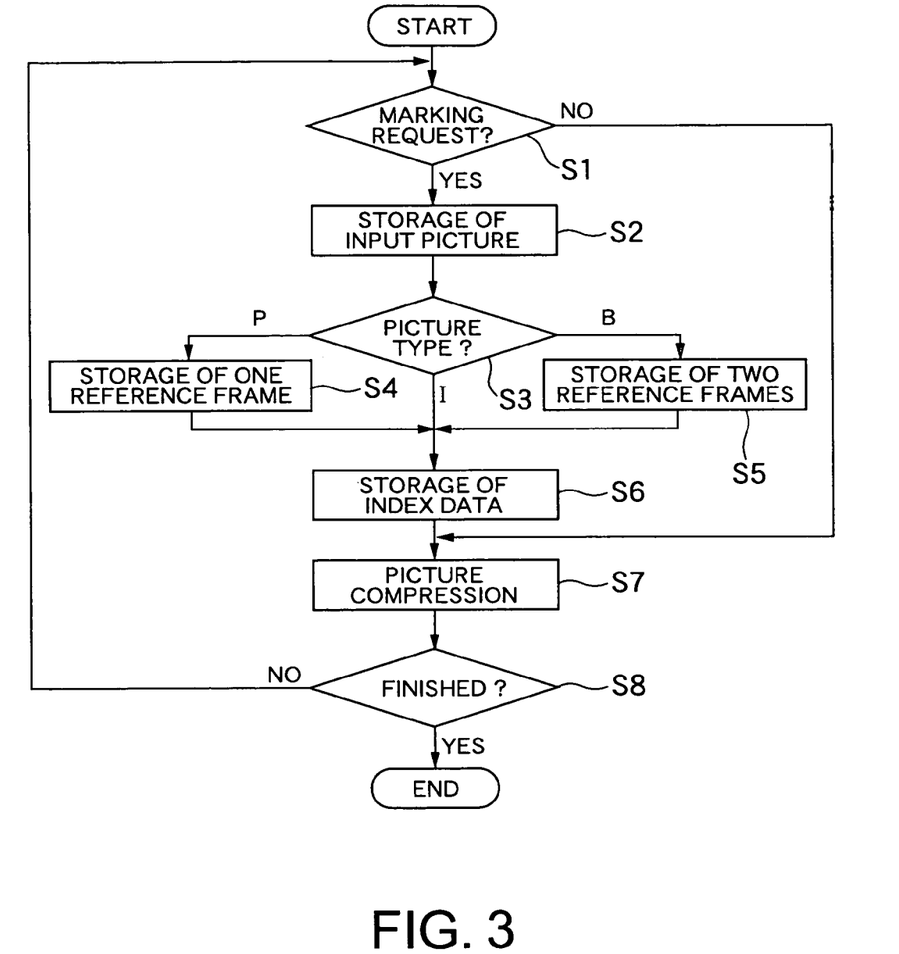
FIG. 3 is a flow chart for describing a compressing operation of the picture compression managing apparatus according to the embodiment of this invention.

Referring to FIG. 3 in addition to FIG. 1, description will be made of a compressing operation of the picture compression managing apparatus of the embodiment.

Supplied with input picture data, the picture compression managing apparatus confirms whether or not the marking request (the index affix request) is supplied from the user (step S1 in FIG. 3). In absence of the marking request, the picture compression managing apparatus compresses the input picture data (step S7 in FIG. 3).

In presence of the marking request, the picture compression managing apparatus stores a current input frame as a still picture (step S2 in FIG. 3). Upon the storage, picture reduction may be performed so as to allow multi-picture display.

Subsequently, the picture compression managing apparatus judges whether or not the reference picture is required in order to compress the current input picture (step S3 in FIG. 3). In case of a P picture (predictive-coded picture) using a previous frame as the reference frame, a single frame to be used as the reference frame is stored (step S4 in FIG. 3).

In case of a B picture (bidirectionally predictive-coded picture) using previous and future pictures as the reference frames, two frames to be used as the reference frames are stored (step S5 in FIG. 3).

In case of an I picture (intra-coded picture) without requiring any reference frame, no frame data is stored. Thus, after storing the reference frame data in dependence upon the picture type, the picture compression managing apparatus stores a write address where compressed picture data is to be written (step S6 in FIG. 3). In this event, the write address is represented by the number of bytes from a start or leading position of the file storing the data being compressed.

After completion of storage of the index data, actual compression is performed (step S7 in FIG. 3). If picture data to be compressed is present yet, the above-mentioned operation is repeated. If no data is left, the compressing operation is finished (step S8 in FIG. 3).

Summarizing in FIGS. 1 and 3, the picture compression managing apparatus includes:

a reduced picture producing section (23, 26, S2) for producing, in response to an index affix request, a reduced input picture by reducing a current input picture of a succession of input pictures included in a picture file which is subjected to picture compression, the reduced picture producing section carrying out at least one of output of the reduced input picture to a display unit and storage of the reduced input picture into the recording medium;

an index producing section (13, 25, S3, S6) for producing, in response to the index affix request, a marking position which is a position of the current input picture with respect to a leading position of the picture file, the index producing section carrying out storage of the marking position as a particular index into the recording medium; and a reference frame producing section (21, 27, S3, S4, S5, S6) for producing at least one of remaining pictures of a succession of the input pictures, the above-mentioned at least one of remaining pictures being used as at least one reference frame in later compressing (S7) the current input picture into a compressed picture, the reference frame producing section carrying out storage of the above-mentioned at least one reference frame into the recording medium.

Figure 4:
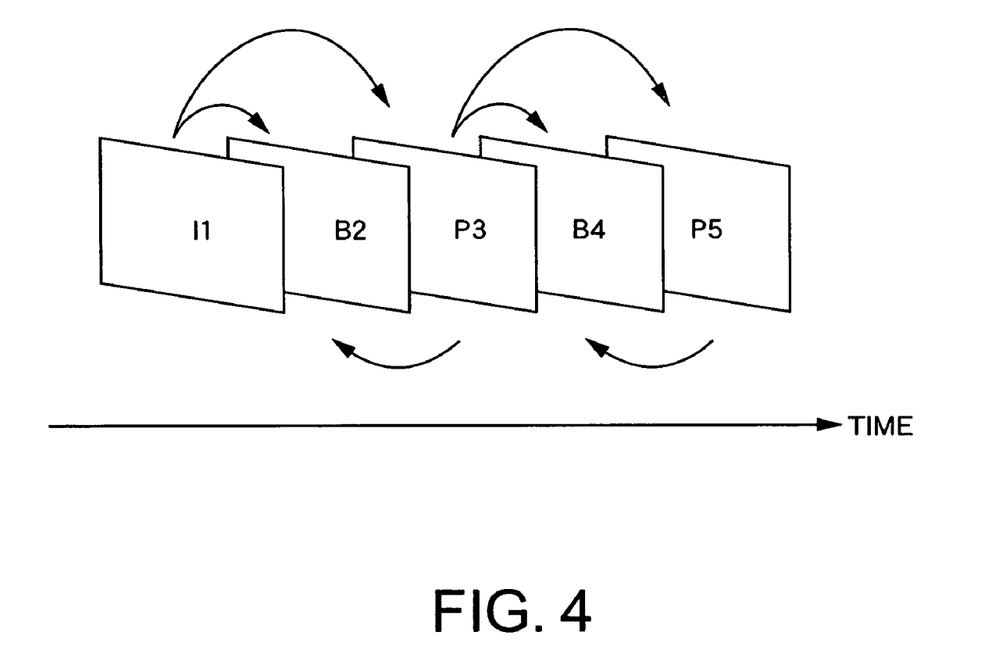
FIG. 4 is a view showing a picture structure of the MPEG system.

Referring to FIG. 4, description will be made of the compressing operation for an MPEG (Moving Picture Experts Group) picture.

The MPEG system has three picture types including the I picture without prediction, the P picture using previous information for prediction, and the B picture using previous and future information for prediction.

In order to compress the B picture B2, the I picture I1 and the P picture P3 are required as the reference pictures. In order to compress the P picture P5, the P picture P3 is required as the reference picture.

However, the input picture is not directly used as the reference picture. The reference picture actually used is the data memorized in the frame memorizing section 21. The reference picture data is prepared by the operation at the dequantizing section 18 and thereafter. The I picture and the P picture require this operation because they may be used as the reference pictures.

Figure 5:
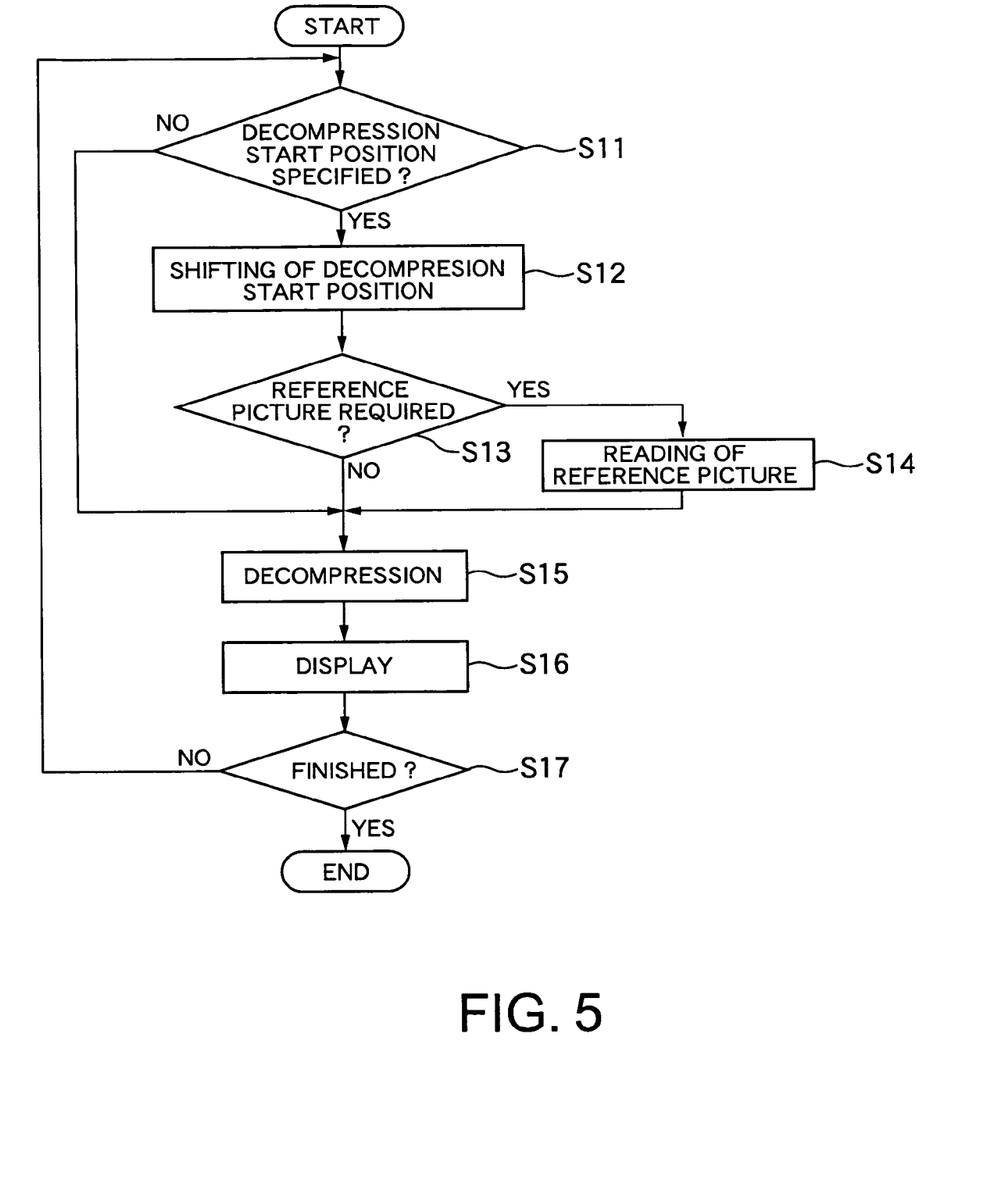
FIG. 5 is a flow chart for describing a decompressing operation of the picture compression managing apparatus according to the embodiment of this invention.

Referring to FIG. 5 in addition to FIG. 2, description will be made of a decompressing operation of the picture compression managing apparatus.

Supplied with the code data, the picture compression managing apparatus confirms whether or not a reproduction start position is specified by, for example, the jump request produced by the user (step S11 in FIG. 5). If the reproduction start position is not specified, the picture compression managing apparatus decompresses the input code (step S15 in FIG. 5).

If the reproduction start position is specified, the picture compression managing apparatus shifts a data read start position to the marking position designated by the particular index, i.e., the position designated by the number of bytes from the start position of a code file (step S12 in FIG. 5). The picture compression managing apparatus checks whether or not the picture to be decompressed is of a type requiring the reference picture (step S13 in FIG. 5).

If the reference picture is required, the picture compression managing apparatus reads the reference picture data stored separately from the code data (step S14 in FIG. 5) and performs the decompressing operation (step S15 in FIG. 5).

After completion of the decompressing operation of a single frame, the picture compression managing apparatus displays the picture of the single frame (step S16 in FIG. 5). If the code data to be decompressed is still left, the above-mentioned operation is repeated. Otherwise, the decompressing operation is finished (step S17 in FIG. 5).

Summarizing in FIGS. 2 and 5, the picture compression managing apparatus includes:

an index acquiring section (32, 34, S12) for acquiring, in response to a jump request to jump to the particular index on subjecting the picture file to picture decompression, the marking position from the recording medium; and a reference frame acquiring section (32, 33, S13, S14) for acquiring, in response to the jump request, the above-mentioned at least one reference frame from the recording medium.

Figure 6:
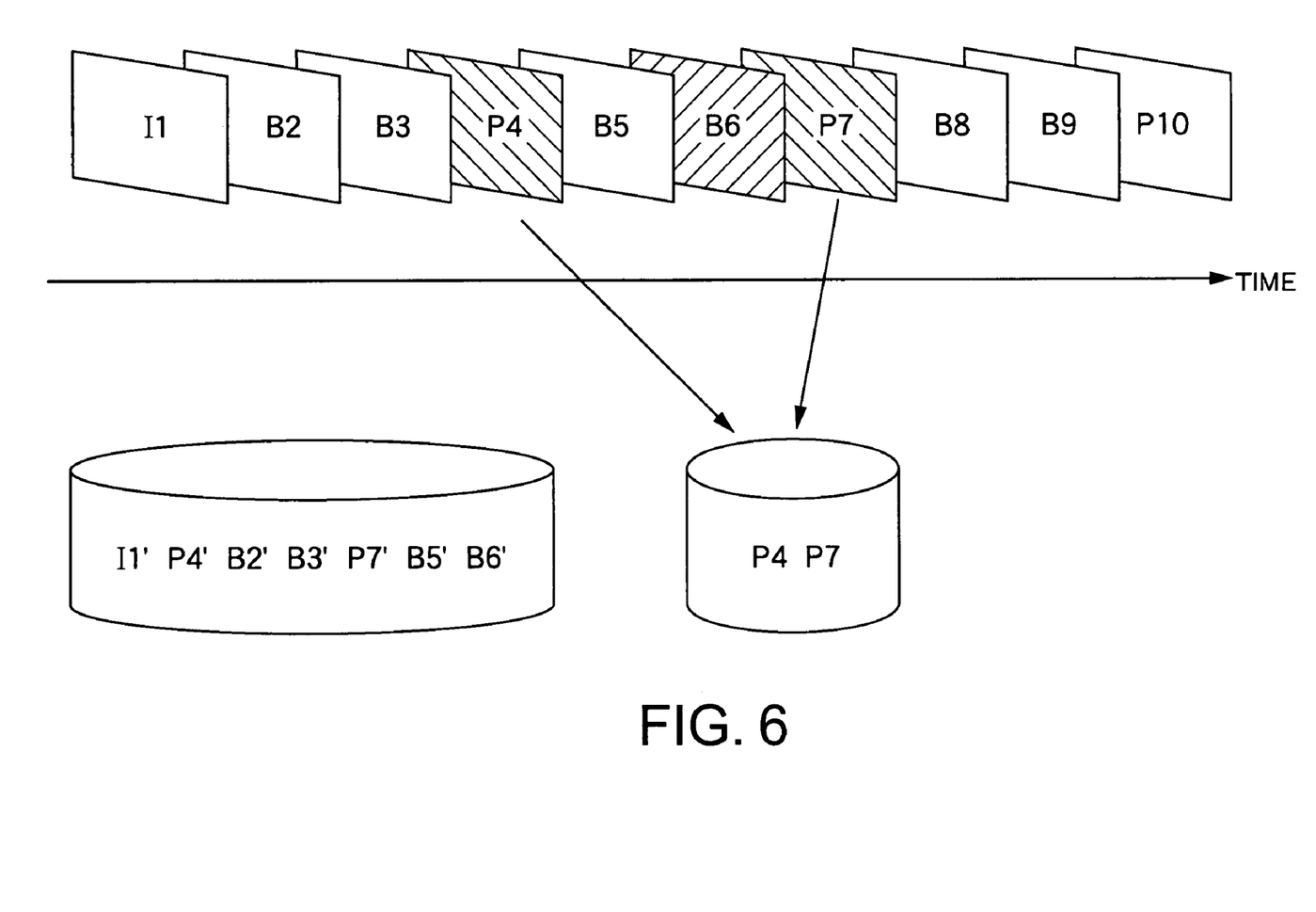
FIG. 6 is a view for describing the compressing operation by the MPEG system in the embodiment of this invention.

Referring to FIG. 6, description will be made of the compressing operation by the MPEG system in the embodiment of this invention.

It is assumed that the input picture supplied frame by frame includes the picture types illustrated in FIG. 6. In order to compress the frame of the B picture B6, the P pictures P4 and P7 are required as the reference frames. The correlation between these two reference pictures and the B picture B6 is obtained per macroblock to carry out compression. A compressed picture B6' given by subjecting the B picture B6 to compression is stored in a recording medium subsequently to a compressed picture B5' given by subjecting a B picture B5 to compression. In the recording medium, compressed pictures I1', P4', B2', B3', and P7' given by compression of pictures I1, P4, B2, B3, and P7 are successively stored before the compressed picture B5' is stored. The frame memorizing section 21 stores the P pictures P4 and P7 having been subjected to the operation at the dequantizing section 18 and thereafter.

It is assumed that the user enters a marking request to affix an index to the B picture B6. In this event, an original or uncompressed picture of the B picture B6 is reduced and stored. In addition, the write position with respect to the start position of the file where the compression code of the B picture B6 is to be written is stored in the index memorizing section 13.

The P pictures P4 and P7 stored in the frame memorizing section 21 as the reference pictures are also stored in the index memorizing section 13. By the use of a table as illustrated in FIG. 7, the index and various information such as the reduced picture can be stored in association.

Figure 7:
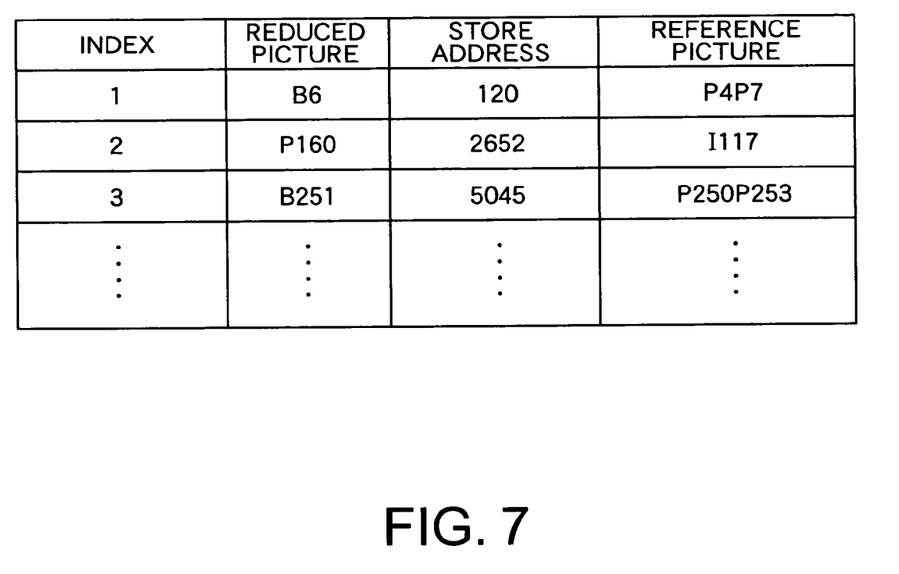
FIG. 7 shows a table storing an index and various information such as a reduced picture in association in the embodiment of this invention.

Referring to FIG. 7, the table stores the indices "1", "2", "3", . . . , the reduced pictures "B6", "P160", "B251", . . . , the store addresses "120", "2652", "5045", . . . , the reference pictures "P4, P7", "I117", "P250, P253", . . . in association with one another.

Figure 8:
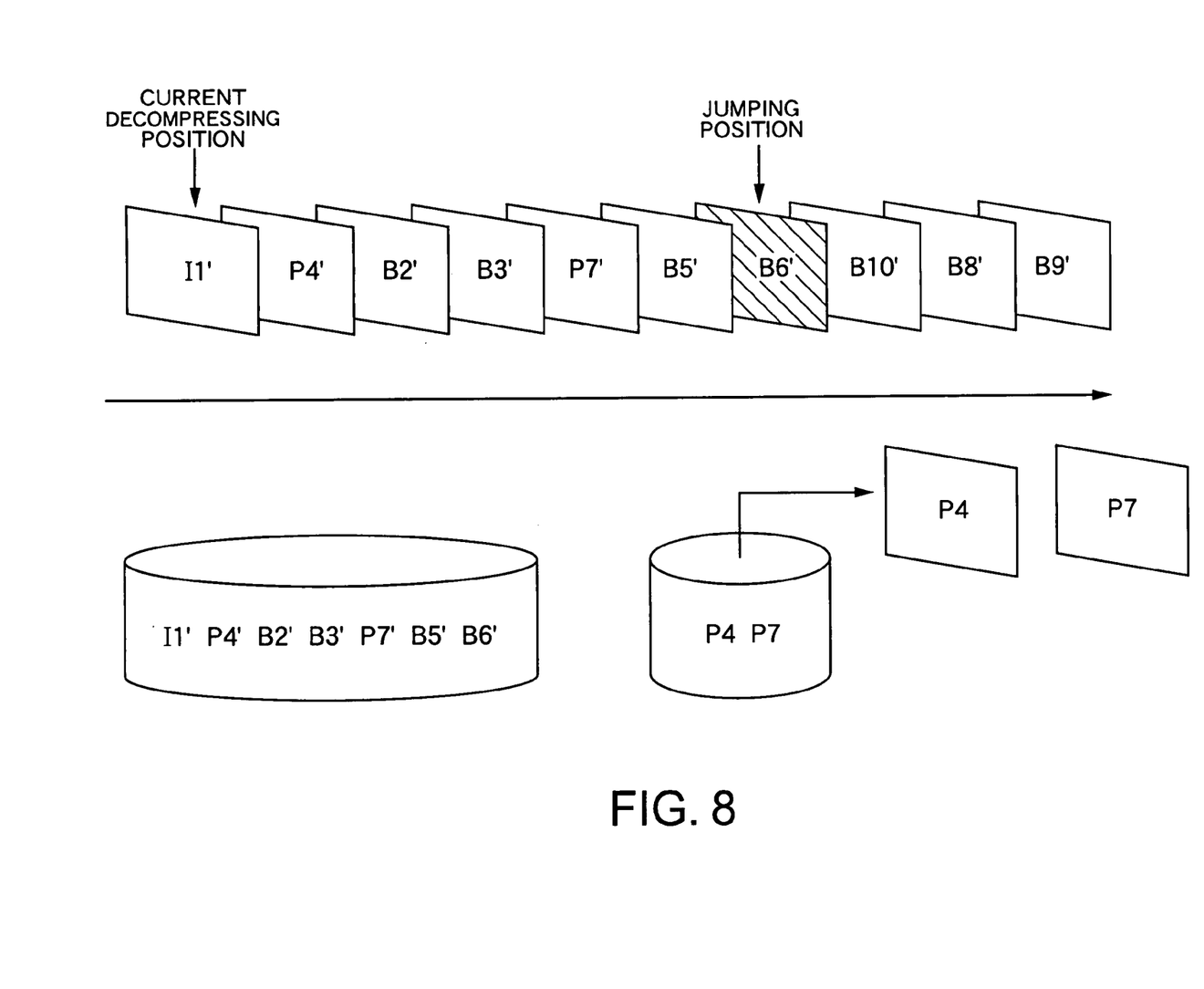
FIG. 8 is a view for describing the decompressing operation by the MPEG system in the embodiment of this invention.

Referring to FIG. 8, description will be made of the decompressing operation by the MPEG system in the embodiment of this invention.

It is assumed that the code data illustrated in FIG. 8 is supplied. A current decompressed picture is the I picture I1'. The user designates a reproducing position to decompress the B picture B6'.

The position of the B picture B6' in the code file is recorded as the address information in the table illustrated in FIG. 7. The decompressed pictures of the P pictures P4' and P7' required as the reference pictures for decompressing the B picture B6' are recorded as the reference picture information in the table illustrated in FIG. 7. Since the code of the B picture B6' and the reference picture data can be extracted from these information, the decompressing operation can instantaneously be carried out.

As described above, marking is performed during the compressing operation. This means that the marking position or the index position need not be a key frame. Therefore, the index can be affixed to any desired frame in the compressed picture.

Since the reference picture required upon decompression can be obtained without using the decompressing operation, reproduction can be started with the decompressing operation for the particular frame alone. Therefore, the decompressing operation of the frame with the index in consideration can be carried out at high speed.

Figure 9:
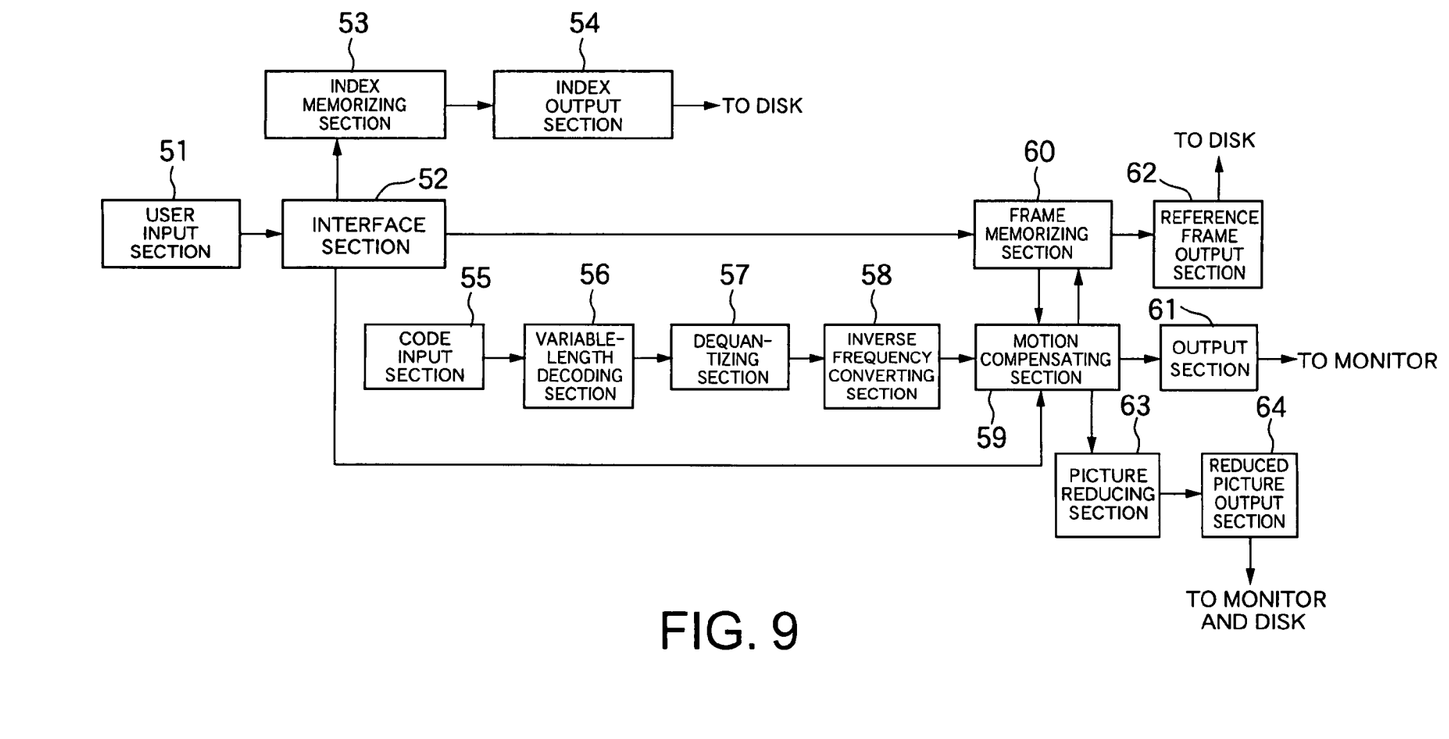
FIG. 9 is a block diagram of a picture decompression processor of a picture compression managing apparatus according to another embodiment of this invention.

Referring to FIG. 9, a picture compression managing apparatus according to another embodiment of this invention has a picture decompression processor including a user input section 51, an interface section 52, an index memorizing section 53, an index output section 54, a code input section 55, a variable-length decoding section 56, a dequantizing section 57, an inverse frequency converting section 58, a motion compensating section 59, a frame memorizing section 60, an output section 61, a reference frame output section 62, a picture reducing section 63, and a reduced picture output section 64.

Each of the above-mentioned sections is generally operable in the following manner. When the code input section 55 is supplied with a compressed picture code from a recording medium such as a disk, the variable-length decoding section 56 decodes the compressed picture code into a frequency component. The dequantizing section 57 dequantizes the frequency component into a dequantized frequency component. The inverse frequency converting section 58 converts the dequantized frequency component into a pixel component. The motion compensating section 59 adds the pixel component to a reference frame memorized in the frame memorizing section 60 to produce picture data. The output section 61 delivers the picture data to a monitor. The picture data thus prepared is stored in the frame memorizing section 60 as a next reference frame.

If a marking request is supplied by the use of a mouse or a keyboard to the user input section 51 during the decompressing operation, the user input section 51 sends the marking request to the interface section 52. The interface section 52 requests each of the index memorizing section 53, the motion compensating section 59, and the frame memorizing section 60 to store related information.

Specifically, the index memorizing section 53 memorizes a recording position in a file being stored where the particular frame is recorded. The index output section 64 delivers position information representative of the recording position to the recording medium.

The motion compensating section 59 sends the particular frame to the picture reducing section 63 to reduce the particular frame into a reduced picture. The reduced picture output section 64 delivers the reduced picture to a monitor and disk (the recording medium). Depending upon the application, the reduced picture output section 64 may deliver the reduced picture to only one of the monitor and the disk (the recording medium).

In case where the particular frame is decompressed by the use of the reference frame, the frame memorizing section 60 delivers the reference frame to the recording medium through the reference frame output section 62.

Figure 10:
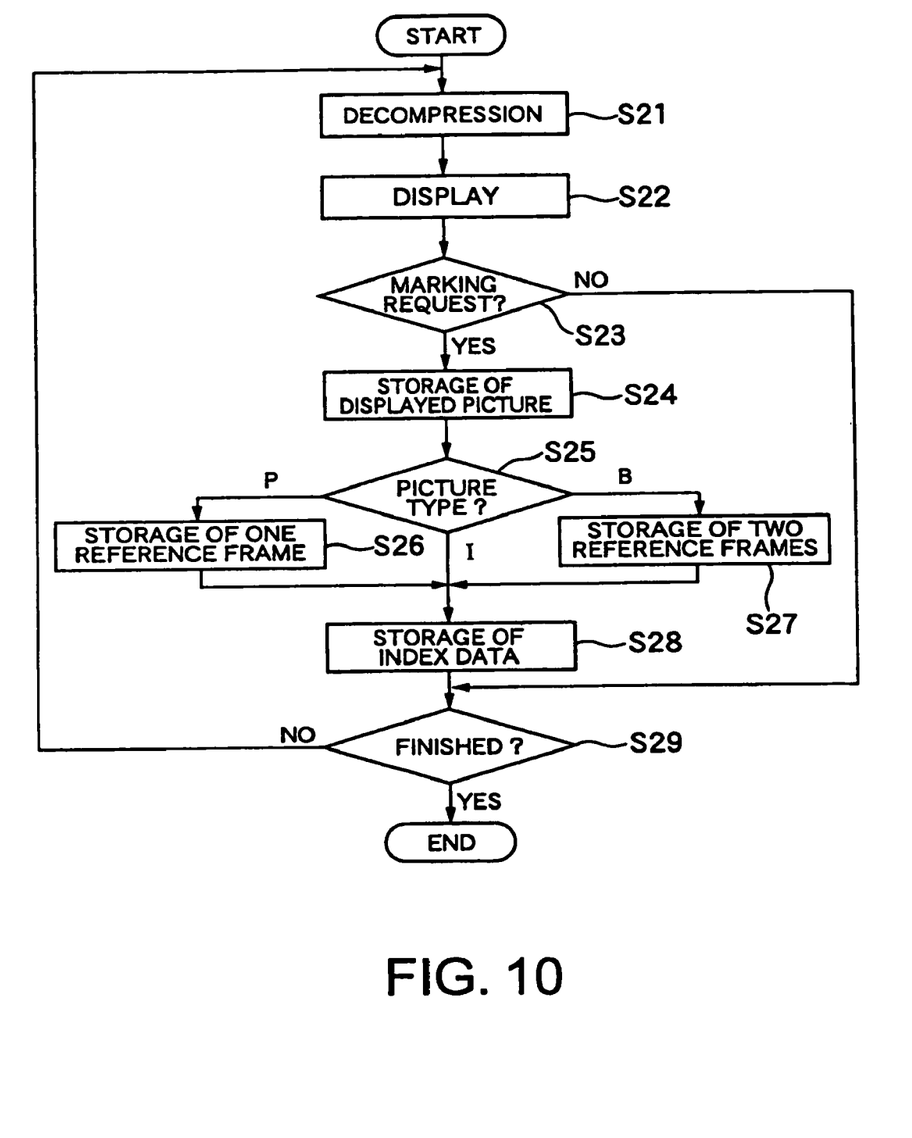
FIG. 10 is a flow chart for describing a decompressing operation of the picture compression managing apparatus according to another embodiment of this invention.

Referring to FIG. 10 in addition to FIG. 9, description will be made of a decompressing operation of the picture compression managing apparatus according to another embodiment of this invention.

Supplied with the code data, the picture compression managing apparatus carries out decompression and display (steps S21 and S22 in FIG. 10). If a marking request is supplied to mark the position of a picture being displayed (step S23 in FIG. 10), the picture compression managing apparatus stores the displayed picture as a still picture (step S24 in FIG. 10). Upon this storage, picture reduction may be performed so as to allow multi-picture display.

The picture compression managing apparatus judges whether or not the reference picture is required to decompress the compressed picture (step S25 in FIG. 10). In case of the P picture using a previous frame as the reference picture, a single frame to be used as the reference frame is stored (step S26 in FIG. 10).

In case of the B picture using previous and future pictures as reference pictures, two frames to be used as the reference pictures are stored (step S27 in FIG. 10). In case of the I picture without requiring any reference frame, no frame data is stored.

After storing the reference frame data in dependence upon the picture type, the picture compression managing apparatus stores a store address where decompressed code data is stored (step S28 in FIG. 10). In this event, the store address is represented by the number of bytes from a start position of the file storing the decompressed frame data.

If the code data to be decompressed is still left, the picture compression managing apparatus repeats the above-mentioned operation. Otherwise, the decompressing operation is finished (step S29 in FIG. 10).

Summarizing in FIGS. 9 and 10, the picture decompression processor is for decompressing a succession of input pictures included as a succession of compressed pictures in a picture file which is subjected to picture decompression.

The picture decompression processor includes:

a reduced picture producing section (63, 64, S24) for producing, in response to an index affix request, a reduced input picture by reducing a current input picture of the succession of input pictures included in the picture file, the reduced picture producing section carrying out at least one of output of the reduced input picture to a display unit and storage of the reduced input picture into the recording medium;

an index producing section (53, 54, S25, S28) for producing, in response to the index affix request, a marking position which is a position of the current input picture with respect to a leading position of the picture file, the index producing section carrying out storage of the marking position as a particular index into the recording medium; and a reference frame producing section (60, 62, S26, S27, S28) for producing at least one of remaining pictures of a succession of the input pictures, the above-mentioned at least one of remaining pictures being used as at least one reference frame in later decompressing (S29) the current input picture into a decompressed picture, the reference frame producing section carrying out storage of the above-mentioned at least one reference frame into the recording medium.

Figure 11:
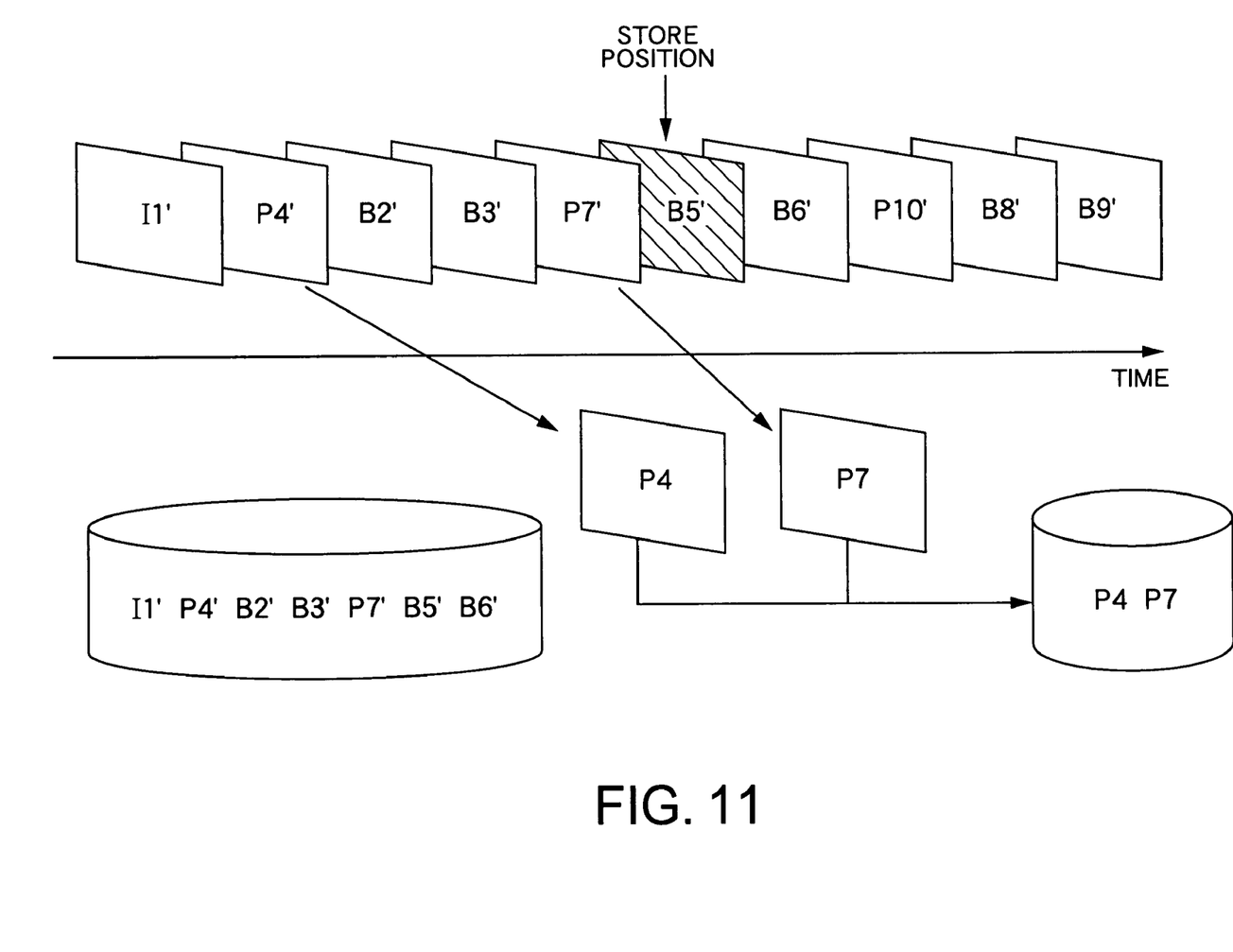
FIG. 11 is a view for describing the decompressing operation by the MPEG system in another embodiment of this invention.

Referring to FIG. 11, description will be made of the decompressing operation by the MPEG system in another embodiment of this invention.

It is assumed that the code data is supplied as illustrated in FIG. 11, A current decompressed picture is the B picture B5'. The user supplies a marking request to affix an index to the B picture B5 being displayed. In this event, the decompressed picture of the B picture B5' is reduced and stored. In addition, the position with respect to the start position of the file where the compression code of the B picture B5' is memorized, The P pictures P4 and P7 stored in the frame memorizing section 60 as the reference pictures are also stored. Thus, this embodiment achieves the effect similar to that described in conjunction with the foregoing embodiment.

As described above, when the marking request is supplied from the outside during picture compression, the picture compression managing apparatus of this invention makes the recording medium record the position of the current input picture with respect to the start position of the file being compressed and stored. The current input picture is reduced into a reduced picture and at least one of the output of the reduced picture to the display section and the storage of the reduced picture into the recording medium is performed. In addition, if the current input picture is produced with reference to another frame, such another frame is memorized in the recording medium as the reference picture. Thus, the index can be affixed to any desired frame in the compressed picture.

In the picture compression managing apparatus of another embodiment of this invention, the marking position with respect to the start position is acquired from the recording medium when the jump request to jump to the particular index is supplied from the outside during the picture decompression. If the reference frame is required in order to decompress the particular frame with the particular index, the reference frame is acquired from the recording medium. Thus, the decompressing operation of the particular frame having the particular index can be carried out at high speed.

What is claimed is:

1. A picture compression managing apparatus comprising:
   a picture compression processor for compressing a moving picture, said moving picture comprising a plurality of frames, said picture compression processor comprising:
      an interface section for receiving an index affix request, said index affix request being a request to affix an index to a frame of said plurality of frames, said frame being compressed by said picture compression processor into a compressed frame to be stored in a file in a recording medium;
      an index producing section for producing, in response to said index affix request, a marking position that is a position in said file at which said compressed frame is stored with respect to a leading position of said file, said index producing section carrying out storage of said marking position as a particular index into said recording medium; and
      a frame memorizing section, said frame memorizing section being configured to store, if said frame is compressed by said picture compression processor into said compressed frame using one or more reference frames of said plurality of frames, said one or more reference frames in decompressed form into said recording medium.

2. The picture compression managing apparatus as claimed in claim 1, wherein the picture compression processor further comprises:
   a reduced picture producing section for producing, in response to index affix request, a reduced input picture by reducing said frame, said reduced picture producing section carrying out at least one of output of said reduced input picture to a display unit and storage of said reduced input picture into said recording medium.

3. The picture compression managing apparatus as claimed in claim 1, further comprising:
   an index acquiring section for acquiring, in response to a jump request to jump to said particular index on subjecting said file to picture decompression, said marking position from said recording medium; and
   a reference frame acquiring section for acquiring, in response to said jump request, said one or more reference frames in decompressed form from said recording medium if said frame was compressed using said one or more reference frames.

4. A picture decompression processor for decompressing a succession of input pictures included as a succession of compressed pictures in a picture file which is subjected to picture decompression, said picture decompression processor comprising:
   a reduced picture producing section for producing, in response to an index affix request, a reduced input picture by reducing a current input picture of said succession of input pictures included in said picture file, said reduced picture producing section carrying out at least one of output of said reduced input picture to a display unit and storage of said reduced input picture into a recording medium;
   an index producing section for producing, in response to said index affix request, a marking position that is a position of said current input picture with respect to a leading position of said picture file, said index producing section carrying out storage of said marking position as a particular index into said recording medium; and
   a reference frame producing section for producing at least one remaining picture of said succession of said input pictures, said at least one remaining picture being used as at least one reference frame in later decompressing said current input picture into a decompressed picture, said reference frame producing section carrying out storage of said at least one reference frame in a decompressed form into said recording medium.

5. A picture compression managing method, comprising:
   compressing a frame of a plurality of frames of a moving picture into a compressed frame using one or more reference frames of said plurality of frames;
   receiving an index affix request to affix an index to said frame;
   storing said compressed frame into a picture file in a recording medium;
   producing, in response to said index affix request, a marking position that is a position in said picture file at which said compressed frame is stored with respect to a leading position of said picture file;
   storing said marking position as a particular index into said recording medium; and
   storing said one or more reference frames in decompressed form into the recording medium.

6. The picture compression managing method as claimed in claim 5, further comprising:
producing, in response to said index affix request, a reduced input picture by reducing said frame; and
carrying out at least one of output of said reduced input picture to a display unit and storage of said reduced input picture into said recording medium.

7. The picture compression managing method as claimed in claim 5, further comprising:
acquiring, in response to a jump request to jump to said particular index on subjecting said picture file to picture decompression, said marking position from said recording medium; and
acquiring, in response to said jump request, said one or more reference frames from said recording medium.

8. A picture decompression processing method of decompressing a succession of input pictures included as a succession of compressed pictures in a picture file which is subjected to picture decompression, said picture decompression processing method comprising:
producing, in response to an index affix request, a reduced input picture by reducing a current input picture of said succession of input pictures included in said picture file;
carrying out at least one of output of said reduced input picture to a display unit and storage of said reduced input picture into a recording medium;
producing, in response to said index affix request, a marking position which is a position of said current input picture with respect to a leading position of said picture file;
carrying out storage of said marking position as a particular index into said recording medium;
producing at least one remaining picture of said succession of said input pictures, said at least one remaining picture being used as at least one reference frame in later decompressing said current input picture into a decompressed picture; and
carrying out storage of said at least one reference frame in a decompressed form into said recording medium.

* * * * *